United States Patent
Wang et al.

(10) Patent No.: US 9,963,393 B2
(45) Date of Patent: May 8, 2018

(54) CERAMIC CAPACITOR DIELECTRIC MATERIAL

(71) Applicant: National Taipei University of Technology, Taipei (TW)

(72) Inventors: Sea-Fue Wang, Taipei (TW); Chun-Wei Chang, Taipei (TW); Jue-Wei Weng, Taipei (TW); Jian-Hua Li, Taipei (TW); Yuan-Cheng Lai, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 0 days. days.

(21) Appl. No.: 14/956,046

(22) Filed: Dec. 1, 2015

(65) Prior Publication Data
US 2017/0015590 A1  Jan. 19, 2017

(30) Foreign Application Priority Data

Jul. 16, 2015  (TW) .............. 104123019 A

(51) Int. Cl.
*C04B 35/468* (2006.01)
*H01G 4/12* (2006.01)

(52) U.S. Cl.
CPC ....... *C04B 35/4686* (2013.01); *H01G 4/1227* (2013.01); *H01G 4/1245* (2013.01); *C04B 2235/3224* (2013.01); *C04B 2235/3227* (2013.01); *C04B 2235/3229* (2013.01); *C04B 2235/3231* (2013.01); *C04B 2235/3232* (2013.01); *C04B 2235/3236* (2013.01); *C04B 2235/3241* (2013.01); *C04B 2235/3244* (2013.01); *C04B 2235/3248* (2013.01); *C04B 2235/3251* (2013.01); *C04B 2235/3258* (2013.01); *C04B 2235/3279* (2013.01); *C04B 2235/3281* (2013.01); *C04B 2235/3284* (2013.01); *C04B 2235/3418* (2013.01); *C04B 2235/442* (2013.01)

(58) Field of Classification Search
CPC ..... C04B 35/4682; C04B 35/47; C04B 35/49; C04B 35/4686
See application file for complete search history.

(56) References Cited

U.S. PATENT DOCUMENTS

| | | | | |
|---|---|---|---|---|
| 3,959,658 A * | 5/1976 | Ziemer | ................. | C09K 11/67 250/484.3 |
| 3,969,252 A * | 7/1976 | Utsumi | ................. | H01B 3/025 361/321.5 |
| 7,580,242 B2 * | 8/2009 | Aman | ................. | C04B 35/49 361/311 |
| 7,790,645 B2 * | 9/2010 | Seki | ................. | H01G 4/1227 361/321.4 |
| 8,067,324 B2 * | 11/2011 | Nenasheva | ........... | C04B 35/053 501/137 |
| 8,450,230 B2 | 5/2013 | Tamura et al. | | |
| 8,841,225 B2 * | 9/2014 | Koga | ................. | C01G 23/006 361/321.4 |
| 2008/0226944 A1 * | 9/2008 | Aman | ................. | C04B 35/4682 428/697 |
| 2009/0149312 A1 * | 6/2009 | Aman | ................. | C04B 35/4682 501/137 |
| 2011/0164346 A1 * | 7/2011 | Tamura | ............... | C04B 35/4682 361/321.1 |
| 2013/0194717 A1 * | 8/2013 | Suzuki | ................. | C04B 35/4682 361/301.4 |

FOREIGN PATENT DOCUMENTS

| JP | 10162648 | * | 6/1998 |
|---|---|---|---|
| JP | 2007119275 | * | 5/2007 |

* cited by examiner

Primary Examiner — Karl E Group
(74) Attorney, Agent, or Firm — Chun-Ming Shih

(57) ABSTRACT

A ceramic capacitor dielectric material includes $BaTiO_3$, $BaZrO_3$, $SrTiO_3$, $MgCO_3$, $SiO_2$, and at least one compound selected from transition element and rare earth element. The amount of the $BaTiO_3$ in the ceramic capacitor dielectric material is 40-80 mol %; the amount of the $BaZrO_3$ is 20-40 mol %; and the amount of the $SrTiO_3$ is smaller than or equal to 20 mol %. The permittivity of the ceramic capacitor dielectric material is larger than 350, and the dielectric loss is lower than 0.5%. Moreover, the resistivity can reach $10^{12}$ $\Omega$-cm under room temperature, and further reach $10^{11}$ $\Omega$-cm at 125° C. Besides that, the performance of the capacitance change rate of the ceramic capacitor dielectric material under DC bias is excellent, thus the ceramic capacitor dielectric material can fulfill the X7T dielectric properties of EIA.

3 Claims, 17 Drawing Sheets

CERAMIC CAPACITOR DIELECTRIC MATERIAL

BACKGROUND

1. Technical Field

The present disclosure is related to a ceramic capacitor dielectric material, particularly to a ceramic capacitor dielectric material made by composite materials and fulfilling the X7T dielectric properties of EIA.

2. Related Art $BaTiO_3$ series electronic ceramics is a newly developed functional ceramics in recent decades. $BaTiO_3$ is a crystalline ceramics, which has asymmetric structure in room temperature. The titanium ion is slightly deviate from the center of the unit cell and thus makes the crystal become tetragonal structure and permanently polarized. This crystal characteristic and the quick response to the applied electric field result in very high specific permittivity for $BaTiO_3$ and the similar materials.

$BaTiO_3$ is often used in the industry of all kinds of ceramic capacitors and dynamic random access memory. The $BaTiO_3$ is mainly used as a material for capacitor, activator, memory, field effect transistor, electronic filter, thermistor, and logic circuit. In recent years, the miniaturization of the portable electronic device makes the Multi-layer Ceramic Capacitors (MLCC) to develop toward low cost, miniaturization, and large storage space. The MLCC type dielectric material which is stable to the temperature includes NP0, X7R, and X7T, etc. As mentioned in the capacitor regulation of American Electronics Industry Association, the capacitance change rate of the X7T between −55° C. to 125° C. should be between +22% to −33%.

Even though $BaTiO_3$ has high specific permittivity, however, the specific permittivity varies largely at −90° C., 0° C., and 125° C., which cannot fulfil the X7T dielectric requirement of EIA, and thus restricting the usage of the $BaTiO_3$.

According to the prior art US 20110164346 and U.S. Pat. No. 8,450,230, those prior arts mainly form shell structure to conform to the X7T regulation. When the shell structure is formed by the $BaTiO_3$, the dielectric peak of the Curie Point can be inhibited to stabilize the stability of the dielectric property to the temperature. The normal forming means is by adding elements and high temperature sintering to cause diffusion. Since the diffusion depth is not even, a concentration gradient will be generated inside the crystal to form a shell structure.

The prior art US 20110164346 and U.S. Pat. No. 8,450,230 mention that the dielectric ceramic composition includes at least one material selected from $BaTiO_3$, (Ba, Ca)$TiO_3$, (Ba, Sr)$TiO_3$, (Ba, Ca, Sr)$TiO_3$, oxide of the rare earth elements or complex compound (including Ba. 9 to 13 mol dielectric composition); the dielectric ceramic composition has shell structure, which further includes diffusion phase and non-diffusion phase. The controlling of the shell structure relies on adding $BaZrO_3$ with different mol %, or rare earth element R, or controlling the speed of raising/cooling temperature. By doing so, the diffusion phase area (S2), the non-diffusion phase (S1), and the average concentration of the rare earth element (C) in the shell structure can be adjusted. By controlling the S1, S2, C to conform to the TDK requirement S1:S2=20:80 to 30:70 and $4.8 \leq S2 \times C \leq 5.8$.

However, the temperature stability of the $BaTiO_3$ can greatly influence the dielectric property. The $BaTiO_3$ is formed as cubic structure between 0° C.~130° C., and the changing of the dielectric property is severe near the Curie Point temperature. In order to overcome the aforementioned problem, a composite material is used. The composite material mainly includes $BaTiO_3$, $BaZrO_3$, $SrTiO_3$, and mixed with at least one compound. In order to minimize the influence caused by the temperature, the $BaZrO_3$ is added to lower the Curie Point temperature to under room temperature to form a stable cubic structure, which can improve the stability of the dielectric property to the temperature. Besides, at least one rare earth element will be selected as a dopant to stabilize the influence of the temperature to the capacitance and the electric field to the temperature, thereby forming a ceramic capacitor dielectric material conforming to the X7T dielectric property requirement of EIA.

BRIEF SUMMARY

The present invention is related to a ceramic capacitor dielectric material which is made by composite materials. The ceramic capacitor dielectric material mainly includes $BaTiO_3$, $BaZrO_3$, $SrTiO_3$, and mixed with at least one compound and a rare earth element to stabilize the influence of temperature and electric field to the capacitance, thereby making a ceramic capacitor dielectric material fulfilling the X7T dielectric properties of EIA.

The present invention relates to a ceramic capacitor dielectric material. In order to minimize the influence of temperature, the $BaZrO_3$ is added to lower the Curie point temperature to under the room temperature, so as to form a stable cubic structure. The stability of the structure can improve the stability of dielectric properties relative to the temperature.

The composition of the ceramic capacitor dielectric material mainly includes $BaTiO_3$, $BaZrO_3$, and $SrTiO_3$, and further mixed with $MgCO_3$, $SiO_2$, and at least one compound selected from transition element and rare earth element, wherein an amount of the $BaTiO_3$ is 40-80 mol %; an amount of the $BaZrO_3$ is 20-40 mol %; and an amount of the $SrTiO_3$ is smaller than or equal to 20 mol %.

More specifically, the added amount of the $MgCO_3$ is 2-6 mol %.

More specifically, the added amount of the $SiO_2$ is smaller than or equal to 2 mol %.

More specifically, the rare earth element is selected from a group consisting of $La_2O_3$, $CeO_2$, $Pr_6O_{11}$, $Nd_2O_3$, $Pm_2O_3$, $Sm_2O_3$, $Eu_2O_3$, $Gd_2O_3$, $Dy_2O_3$, $Ho_2O_3$, $Er_2O_3$, $Tm_2O_3$, and $Yb_2O_3$, and the added amount of the rare earth element is 0.5-10 mol %.

More specifically, the transition element is selected from a group consisting of $Nb_2O_5$, $WO_3$, $Ta_2O_5$, $CoCO_3$, $CuO$, $MnCO_3$, $Cr_2O_3$, $TiO_2$, $ZrO_2$, $Sc_2O_3$, $NiO$, and $ZnO$, and the added amount of the transition element is 0.5-10 mol %.

More specifically, after the main composition of the ceramic capacitor dielectric material is mixed with at least one compound, a sintering process can proceed. The sintering temperature should be able to make sure the ceramic capacitor reach the desired density.

More specifically, the dielectric loss of the ceramic capacitor dielectric material under room temperature is smaller than 0.5%.

More specifically, the capacitance change rate of the ceramic capacitor dielectric material between −55 to 125° C. is +22% to −33%.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
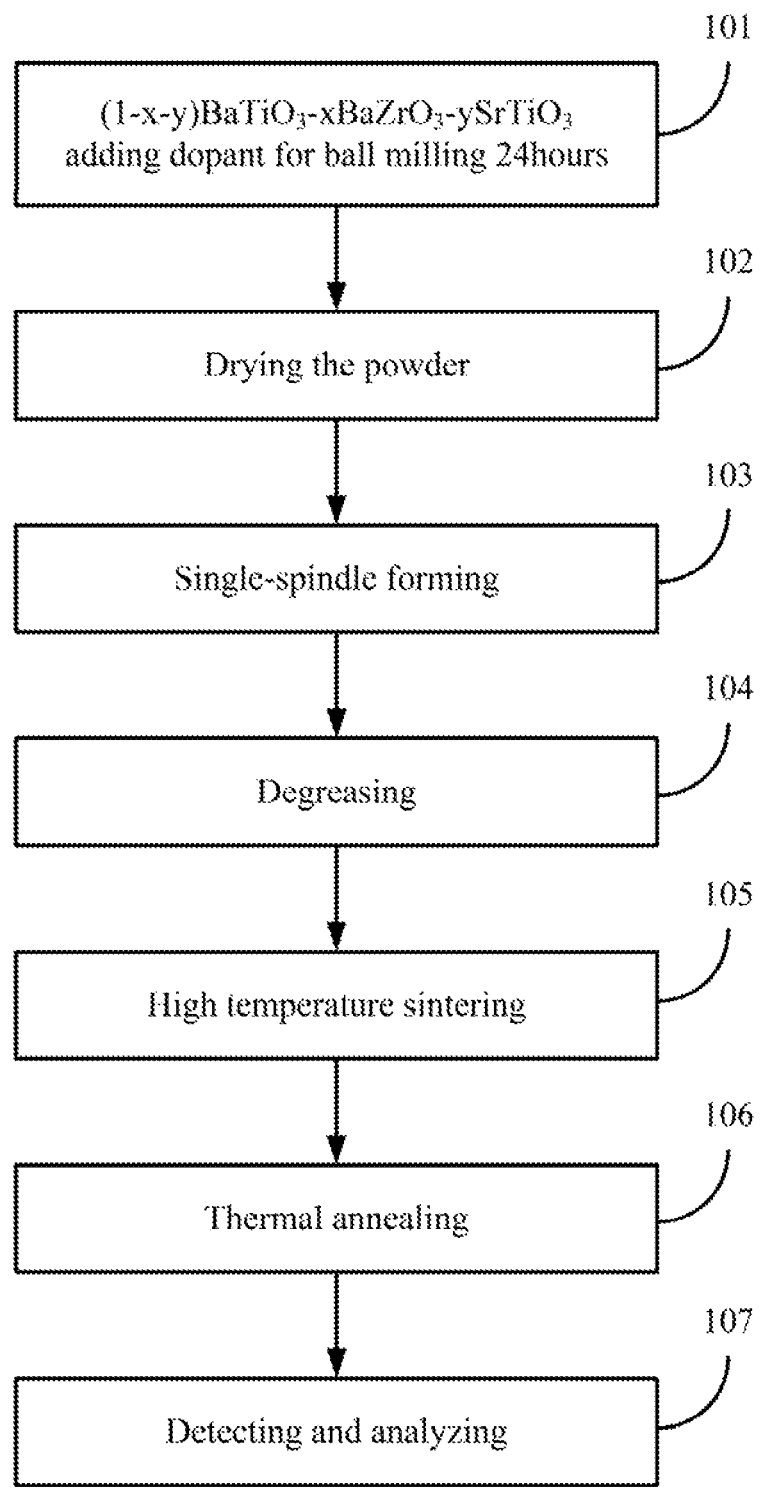
FIG. 1 is a preparation process diagram of the ceramic capacitor dielectric material according to the present invention.
Figure 2A:
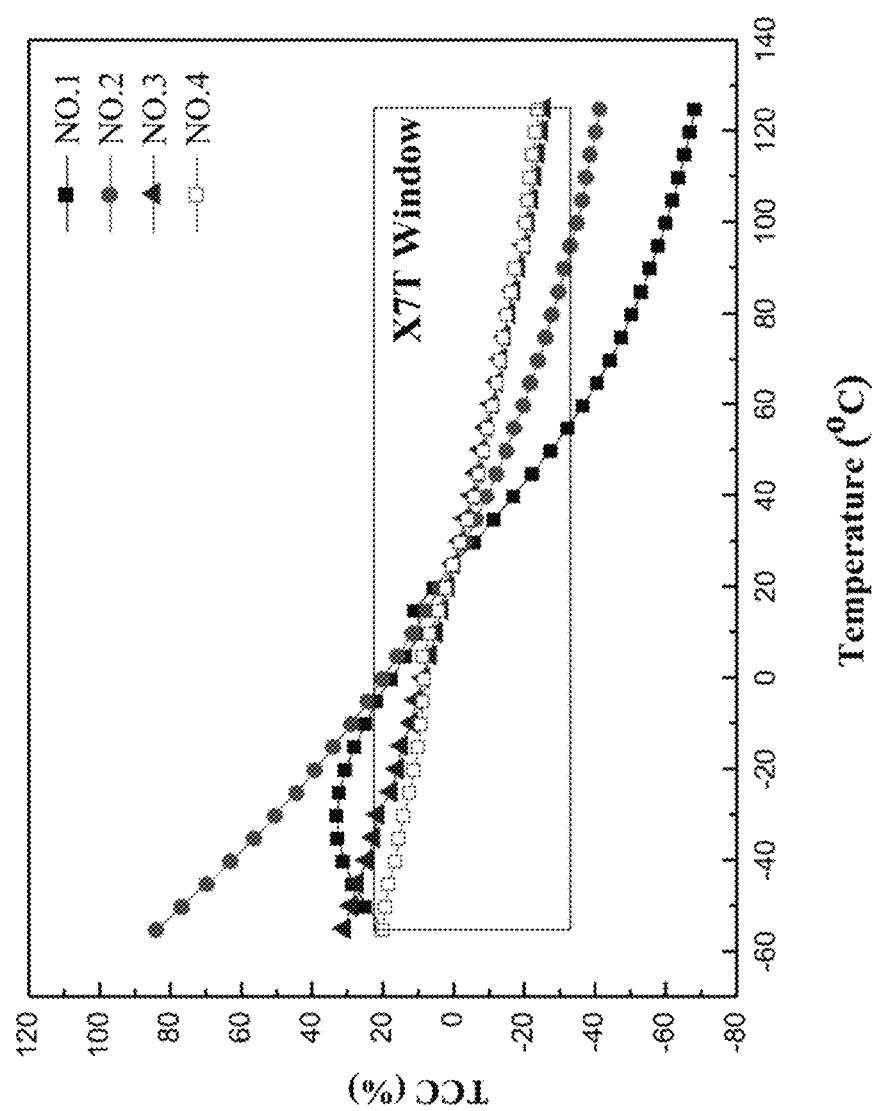
FIG. 2A is a relative schematic diagram of the TCC and temperature of different experimental groups of the ceramic capacitor dielectric material.
Figure 2B:
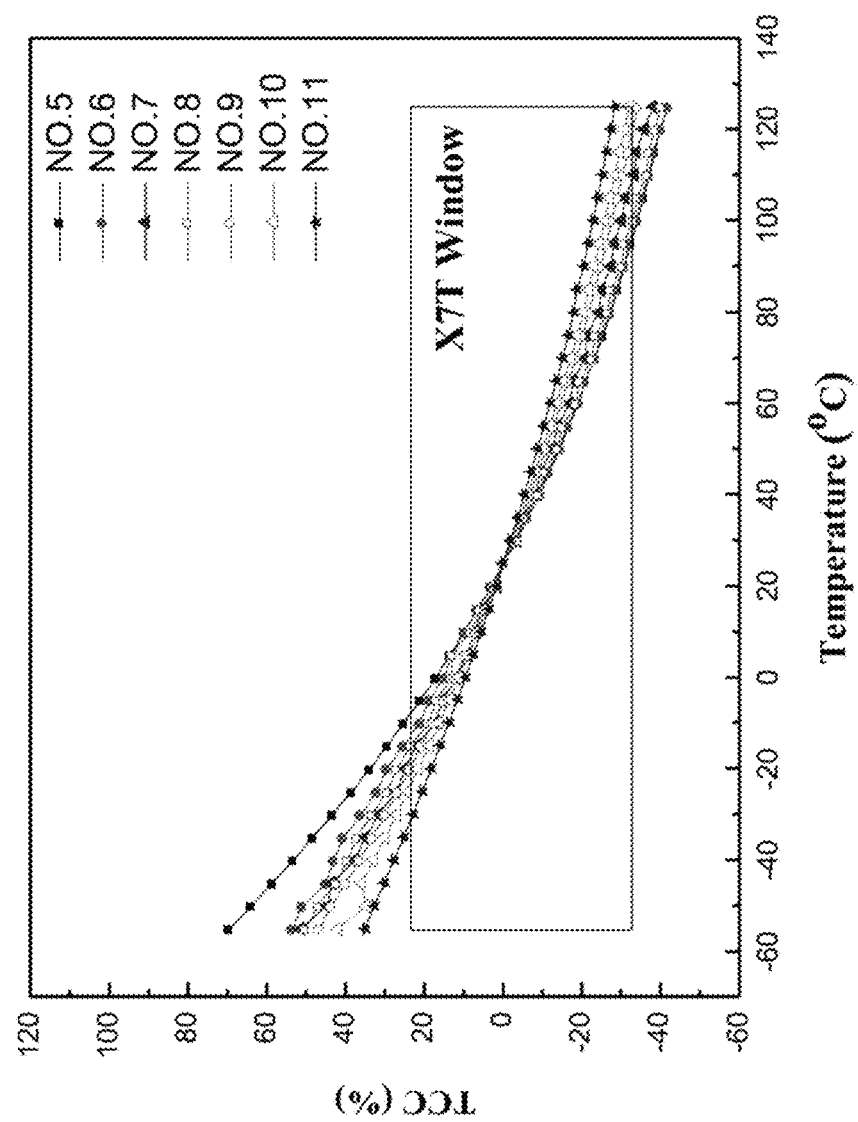
FIG. 2B is a relative schematic diagram of the TCC and temperature of different experimental groups of the ceramic capacitor dielectric material.
Figure 2C:
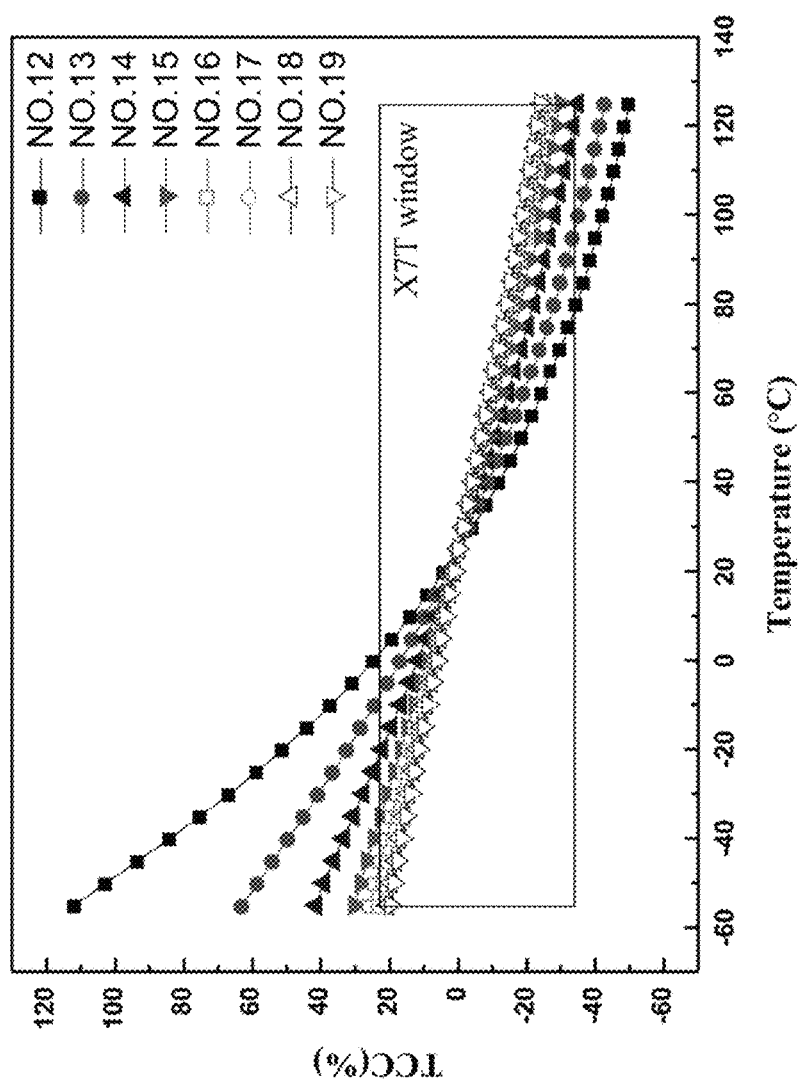
FIG. 2C is a relative schematic diagram of the TCC and temperature of different experimental groups of the ceramic capacitor dielectric material.
Figure 2D:
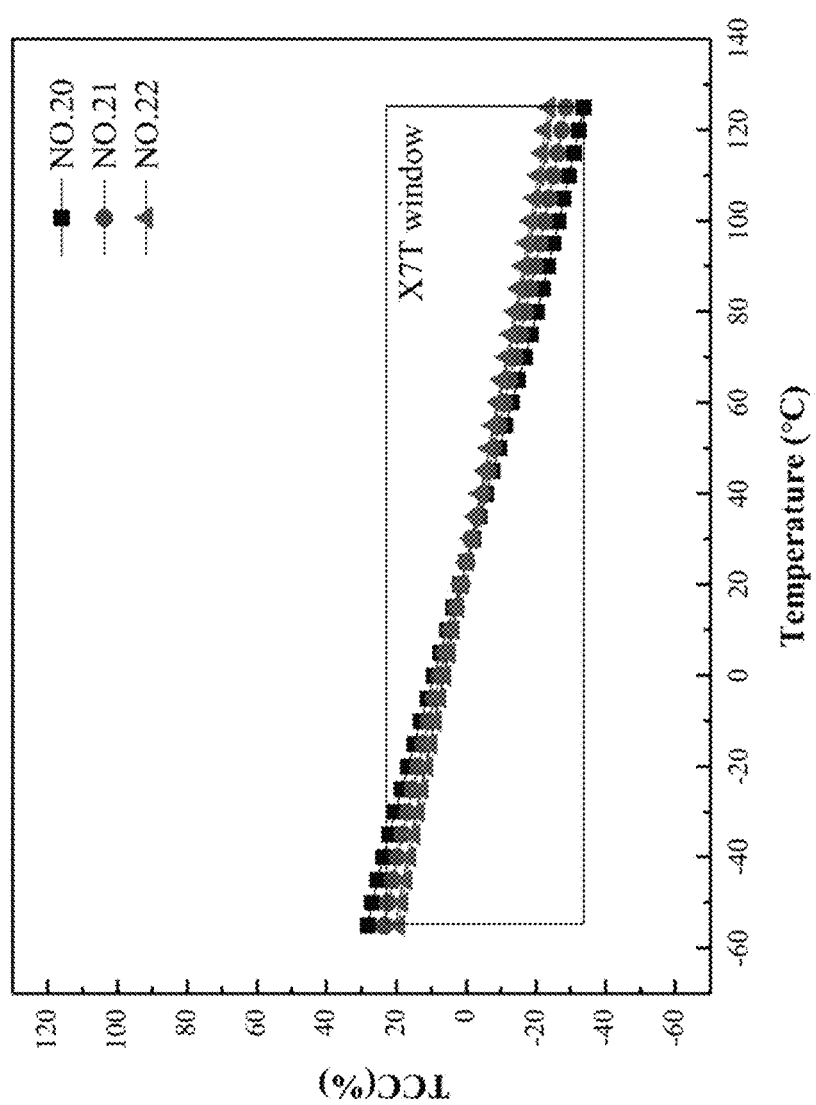
FIG. 2D is a relative schematic diagram of the TCC and temperature of different experimental groups of the ceramic capacitor dielectric material.
Figure 3A:
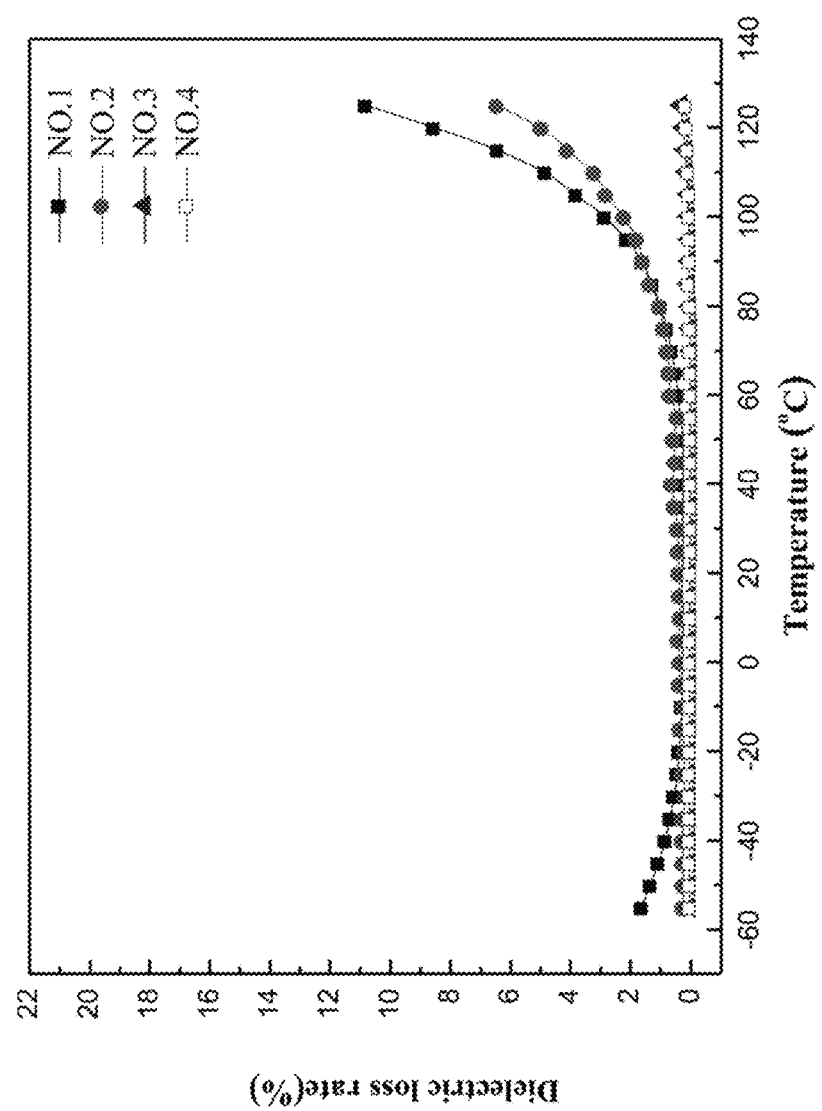
FIG. 3A is a relative schematic diagram of the dielectric loss and temperature of different experimental groups of the ceramic capacitor dielectric material.
Figure 3B:
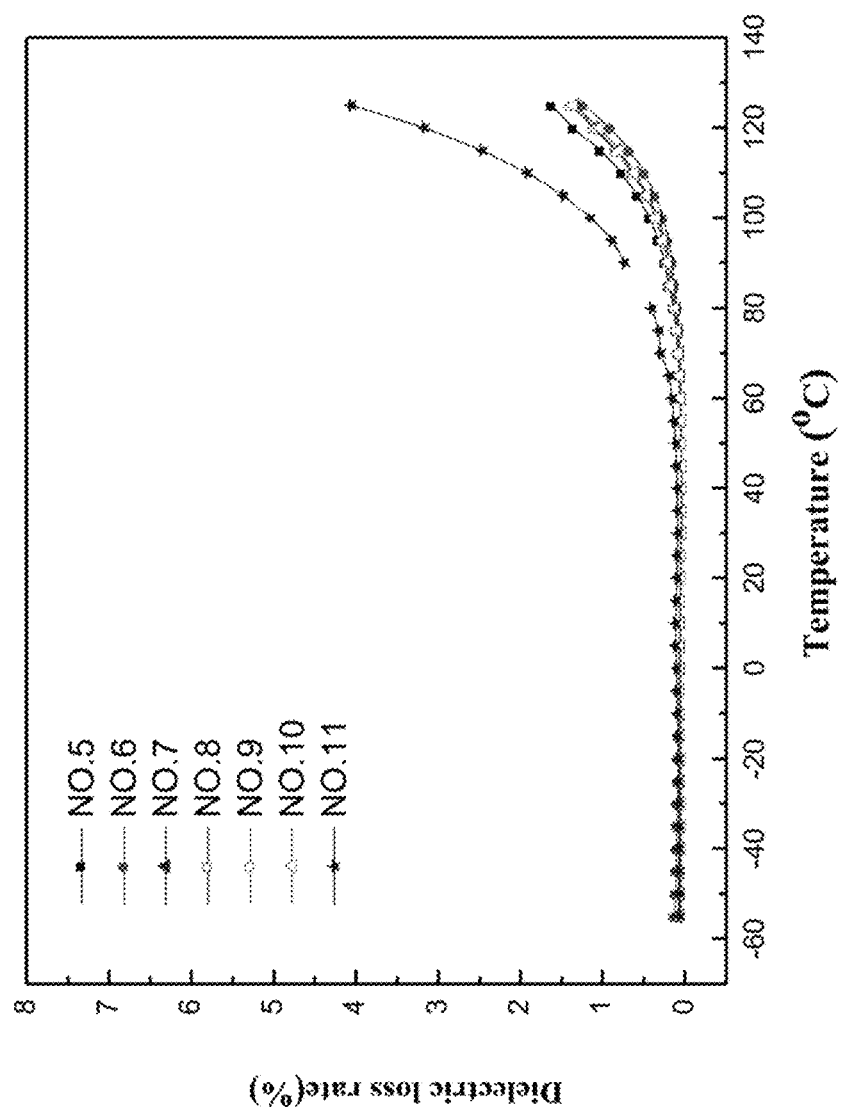
FIG. 3B is a relative schematic diagram of the dielectric loss and temperature of different experimental groups of the ceramic capacitor dielectric material.
Figure 3C:
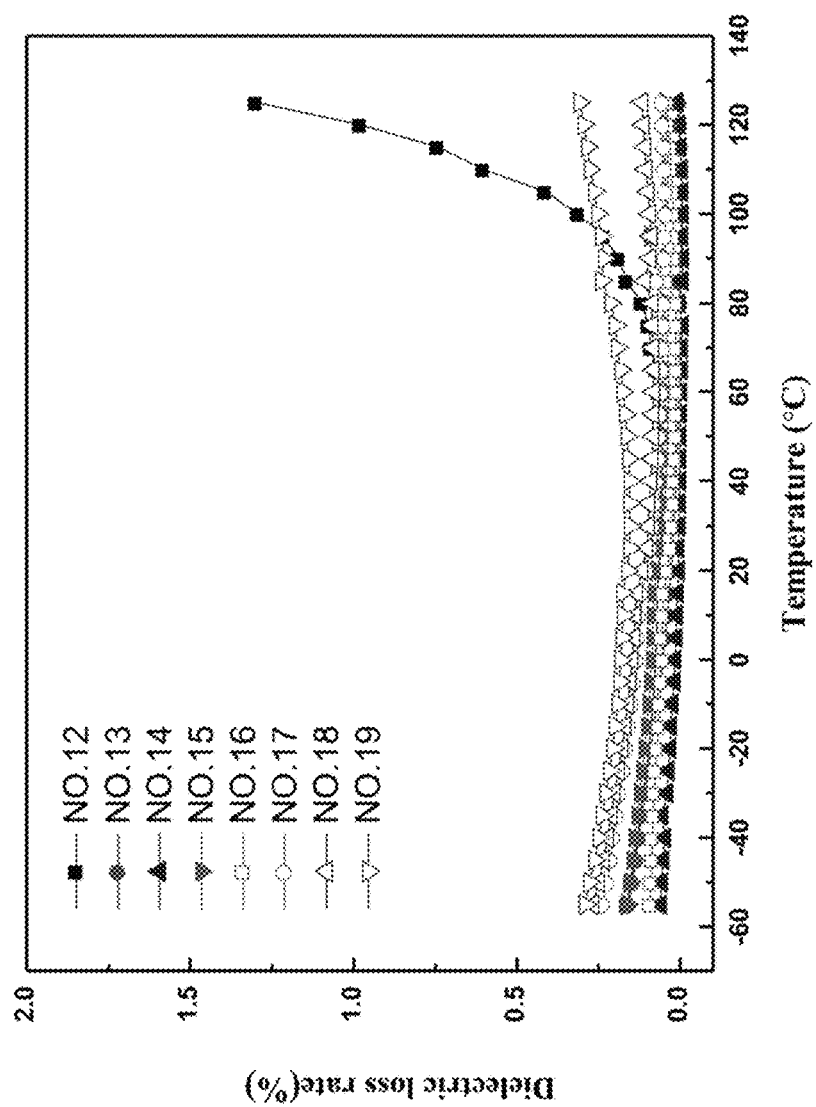
FIG. 3C is a relative schematic diagram of the dielectric loss and temperature of different experimental groups of the ceramic capacitor dielectric material.
Figure 3D:
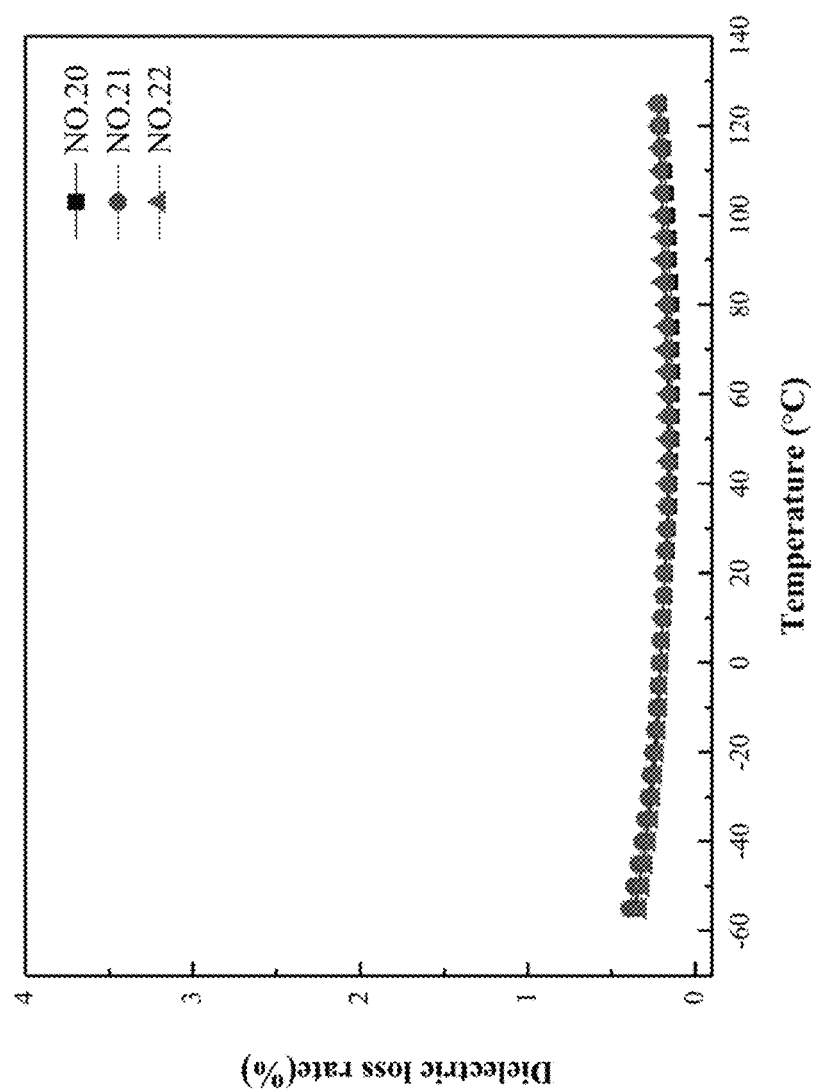
FIG. 3D is a relative schematic diagram of the dielectric loss and temperature of different experimental groups of the ceramic capacitor dielectric material.
Figure 4A:
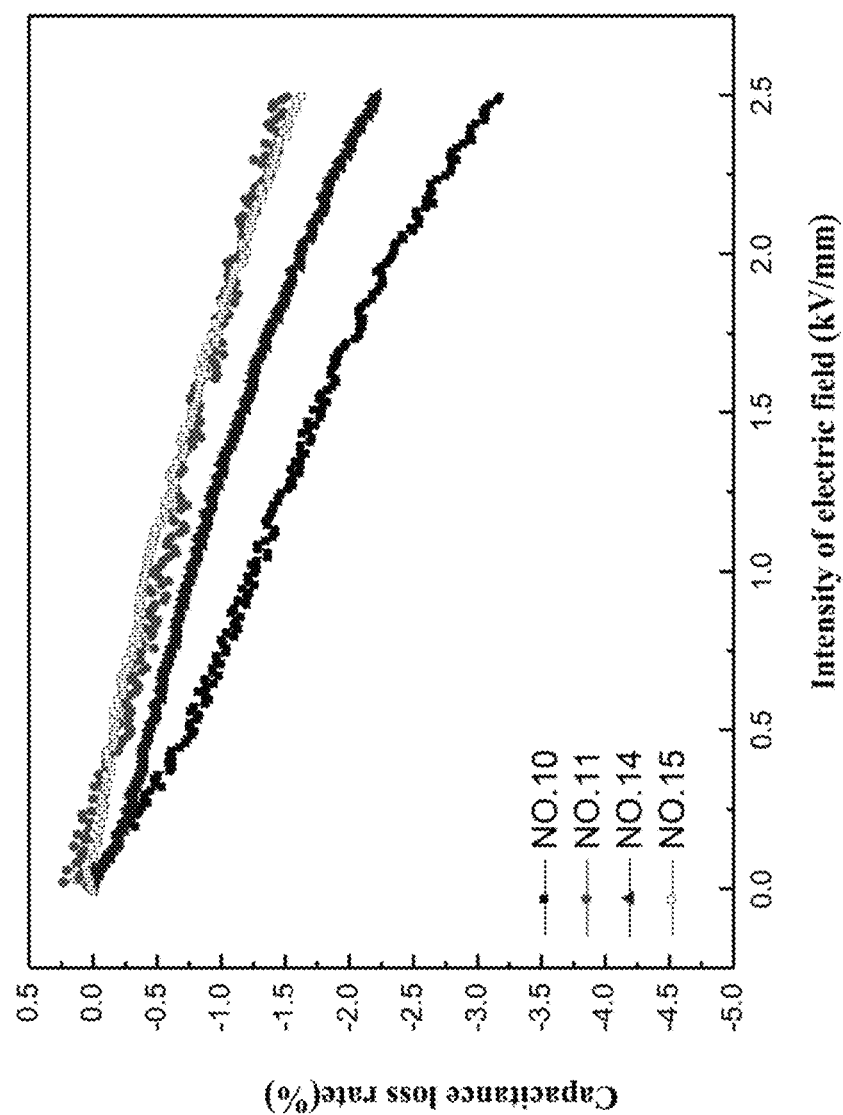
FIG. 4A is an analysis schematic diagram of the dielectric loss of different experimental groups of the ceramic capacitor dielectric material.
Figure 4B:
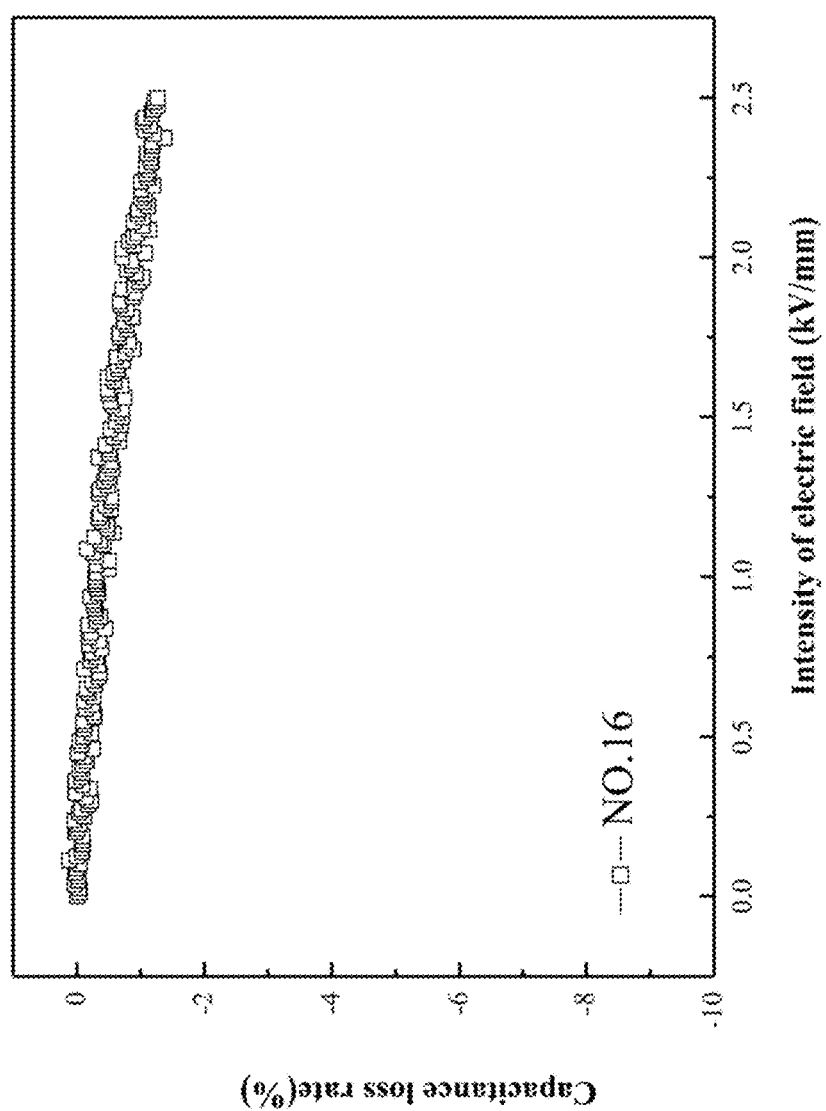
FIG. 4B is an analysis schematic diagram of the dielectric loss of different experimental groups of the ceramic capacitor dielectric material.
Figure 4C:
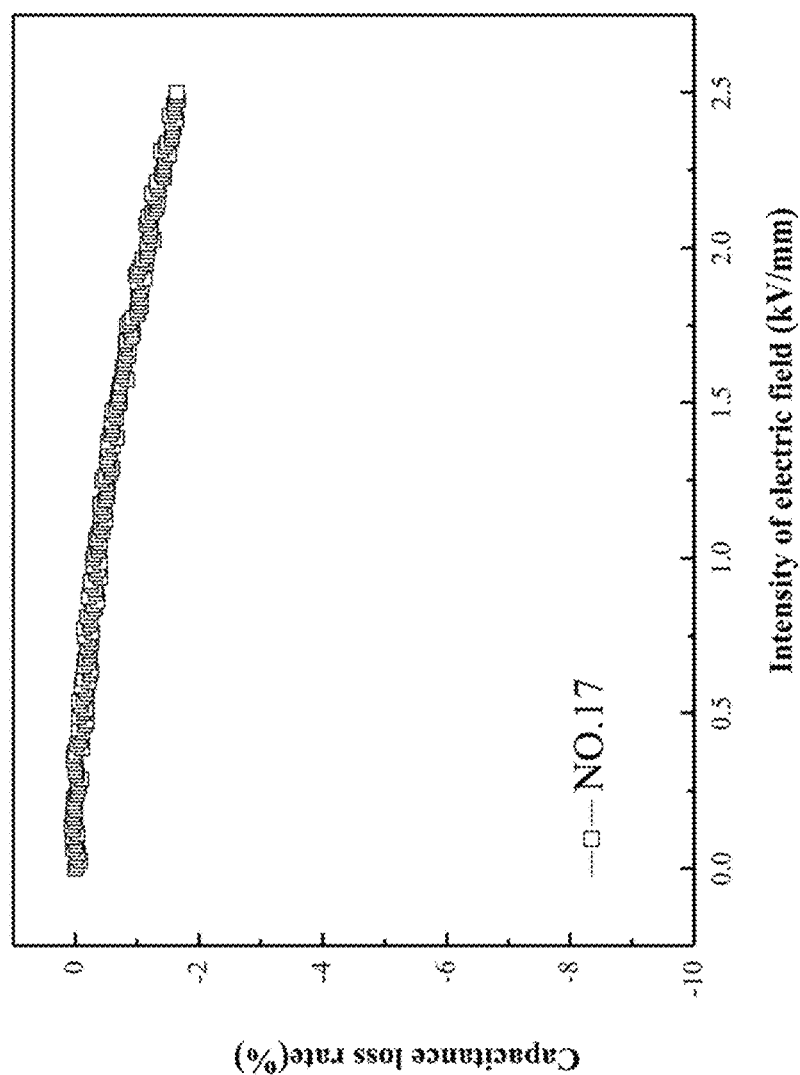
FIG. 4C is an analysis schematic diagram of the dielectric loss of different experimental groups of the ceramic capacitor dielectric material.
Figure 4D:
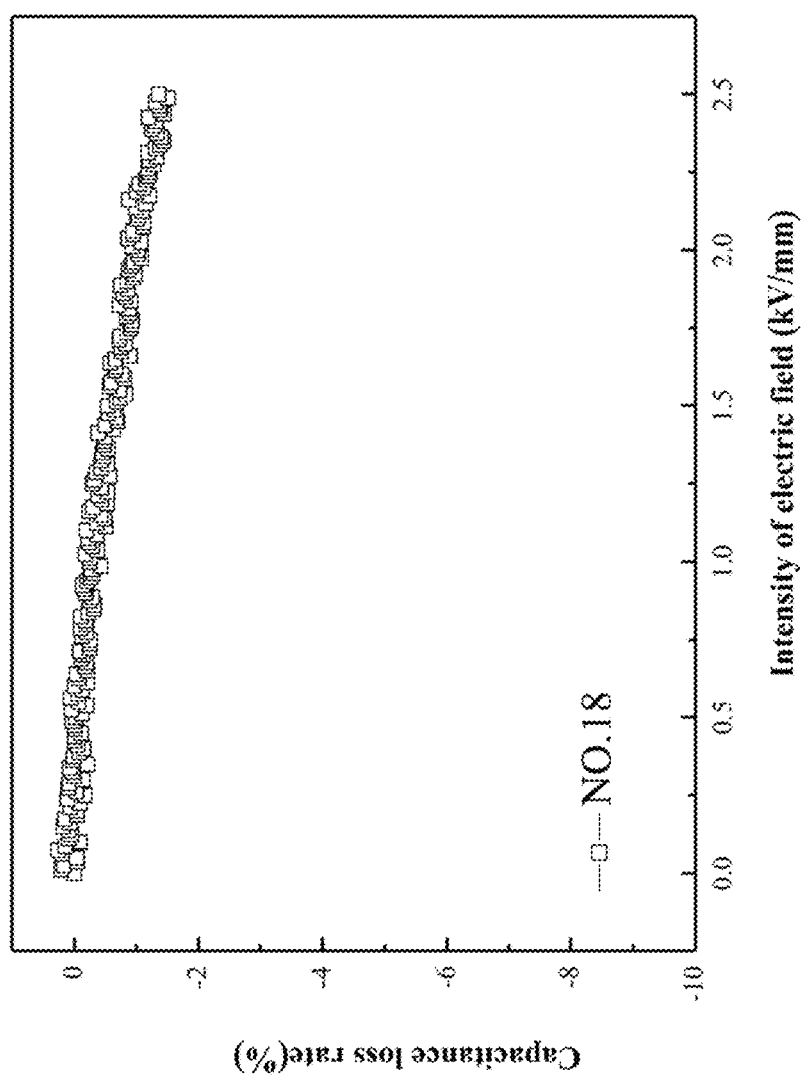
FIG. 4D is an analysis schematic diagram of the dielectric loss of different experimental groups of the ceramic capacitor dielectric material.
Figure 4E:
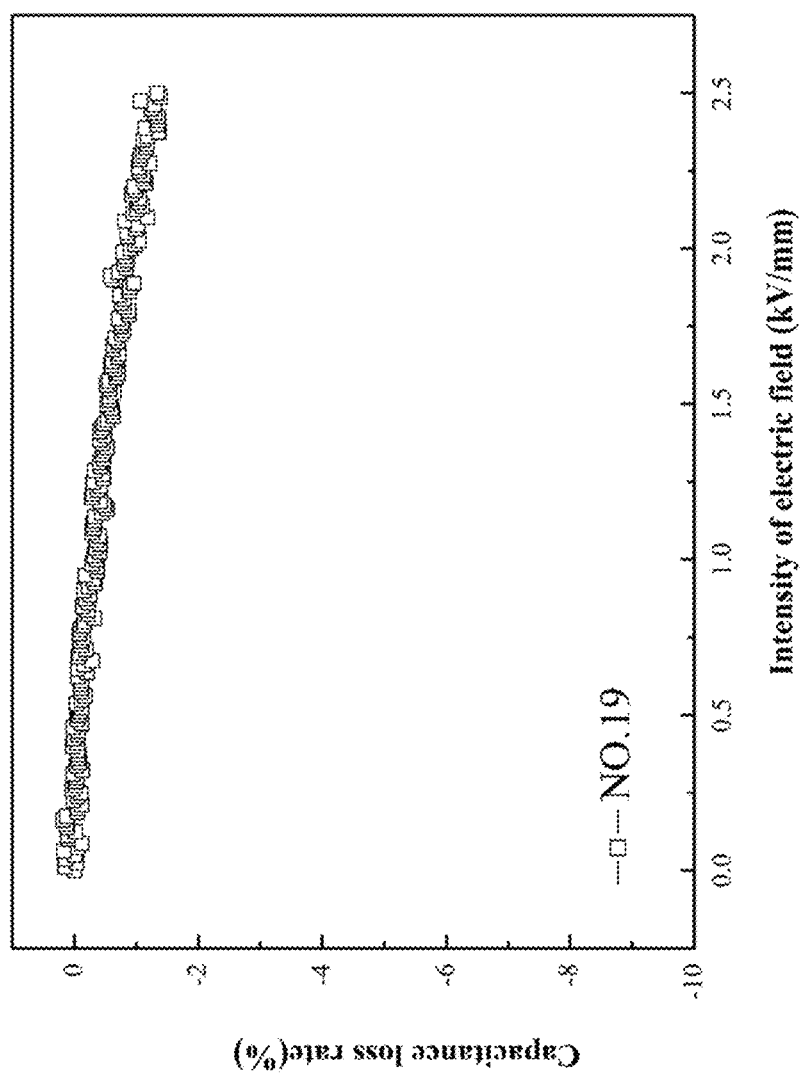
FIG. 4E is an analysis schematic diagram of the dielectric loss of different experimental groups of the ceramic capacitor dielectric material.
Figure 4F:
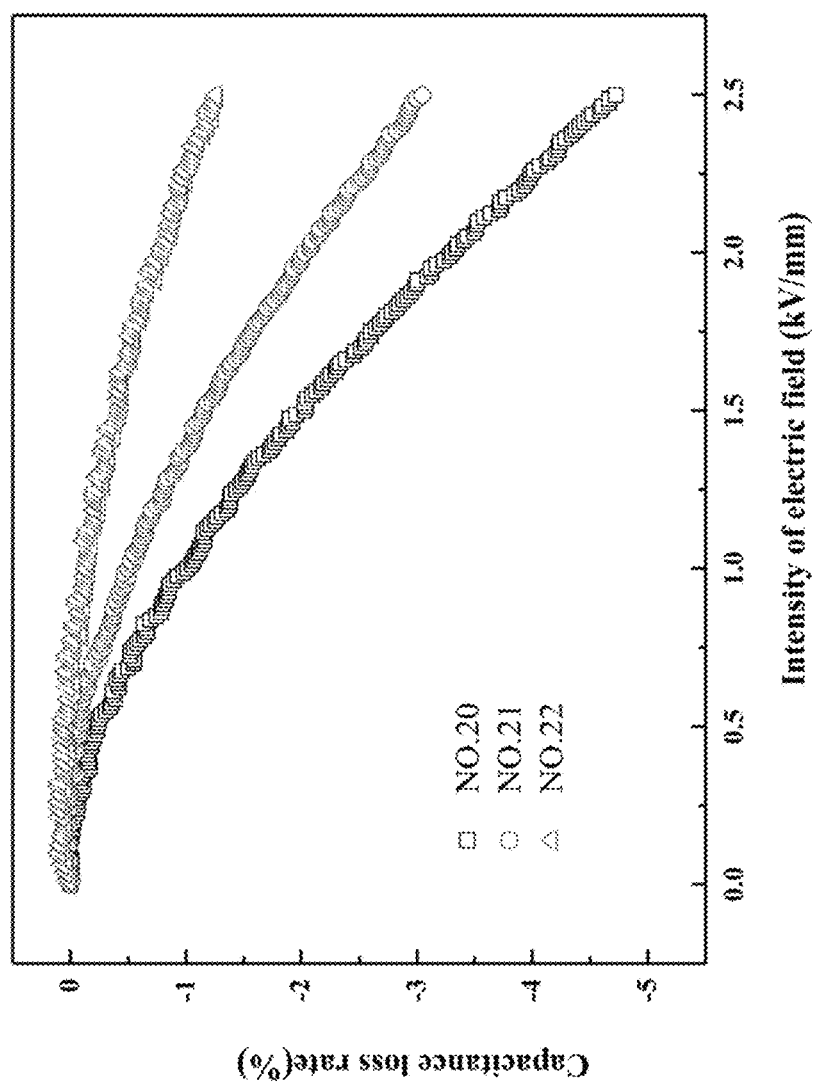
FIG. 4F is an analysis schematic diagram of the dielectric loss of different experimental groups of the ceramic capacitor dielectric material.

Please refer to FIG. 1, as steps as shown in FIG. 1 are as follows:
(1) Step 101: add dopant to the (1-x-y)BaTiO$_3$-xBaZrO$_3$-ySrTiO$_3$ to form a mixture, and those mixtures are placed in a milling tank having a Zirconia ball and alcohol according to different mixing ratio for milling 24 hours, and then taken out to be dried out. Wherein, $0.2 \leq x \leq 0.4$, $0.0 \leq y \leq 0.2$ 101;

(2) Step 102: evenly mill the mixture and add proper amount of binder PVA for granulation, and then perform the sieving with 60 mesh sieve;

(3) Step 103: the milled powder after being sieved is performed a single-spindle forming, an a clay body with 90 mm diameter and 1 mm thickness can be created under 1 ton pressure for 30 seconds;

(4) Step 104: perform binder burning (degreasing) in a condition of keeping at 550° C. for 4 hours, heating rate 5° C./min;

(5) Step 105: the degreased samples are kept at different temperatures for 2 hours under reducing atmosphere to perform high temperature sintering, the heating rate is 5° C./min;

(6) Step 106: after the sintering process is completed, the samples are performed annealing under room atmosphere at 900° C., the heating rate is 5° C./min and the temperature is kept for 2 hours;

(7) step 107: perform Archimedes density measurements and select high density sample to do the XRD and SEM analysis. And then, the selected sample is double-sided polished and evenly covered with an electrode paste, and is performed with electrode sticking under 800° C. (temperature not kept in the process) after being dried out. The final sample being electrode stuck is used to do the dielectric properties analysis and measurement.

The composition of the ceramic capacitor dielectric material according to the present invention is mainly composed of BaTiO$_3$, BaZrO$_3$, SrTiO$_3$, and further mixed with MgCO$_3$, SiO$_2$ and at least one compound selected from transition element and rare earth element, wherein an amount of the BaTiO$_3$ is 40-80 mol %; an amount of the BaZrO$_3$ is 20-40 mol %; and an amount of the SrTiO$_3$ is smaller than or equal to 20 mol %; wherein the BaZrO$_3$ can be added in a form of element powder, or synthesized by different elements (such as BaO+ZrO$_2$). Therefore, synthesize the BaZrO$_3$ by many different means and add the BaZrO$_3$ in the ratio range as revealed in the present invention is protected by the present invention. The BaTiO$_3$, SrTiO$_3$, MgCO$_3$, SiO$_2$, and the transition element or rare earth element, no matter how to synthesize or being added in what ratio, like BaZrO$_3$, are also protected by the present invention.

Besides, any ceramic capacitor dielectric material which is mainly composed of BaTiO$_3$, BaZrO$_3$, SrTiO$_3$, and further mixed with MgCO$_3$, SiO$_2$ and at least one compound, if the composition ratio of any one of the BaTiO$_3$, BaZrO$_3$, SrTiO$_3$, MgCO$_3$, SiO$_2$, transition element, or rare earth element is the same as disclosed by the present invention, should be protected by the present invention as well.

Besides, the added compound can also be MgTiO$_3$, and the added amount is 0-6 mol % (mole percentage can be 0, 0.5, 1, 1.5, 2, 2.5, 3, 3.5, 4, 4.5, 5, 5.5 or 6 mol %)

Wherein, the added amount of the BaTiO$_3$ is 40-80 mol % (can be 45, 50, 55, 60, 65, 70, 75, or 80 mol %); the added amount of the BaZrO$_3$ is 20-40 mol % (can be 20, 25, 30, 35, or 40 mol %); and the added amount of the SrTiO$_3$ is smaller than or equal to 20 mol % (can be 0, 5, 10, 15, 20 mol %).

Wherein, the added amount of the MgCO$_3$ is 2-6 mol % (can be 2, 2.5, 3, 3.5, 4, 4.5, 5, 5.5, or 6 mol %). The purpose of adding MgCO$_3$ is adjusting A/B ratio because BaTiO$_3$ can form oxygen vacancy when being sintered under reduce atmosphere, so that the dielectric material can easily act like a semiconductor based on the balance of chemical reaction. Therefore, the BaTiO$_3$ is added to replace the Ti$^{4+}$ ion with Mg$^{2+}$ ion, and the reliability of the dielectric material can thus be improved.

Wherein, the added amount of the $SiO_2$ is smaller than or equal to 2 mol % (can be 0, 0.5, 1, 1.5, or 2 mol %). The $SiO_2$ is used as a sintering aid for helping the sintering of the ceramic body. The $SiO_2$ can not only lower the sintering temperature, but also increase the sintering density. The sintering body has pores, more pores the sintering body has, the more decreasing of the electric dipole moment of the unit volume, which can influence the whole dielectric property. The dielectric property can also be influenced if other materials enter into the pores. Therefore, the $SiO_2$ is added to improve this condition, and the electric resistance coefficient of the dielectric material can be improved as well.

In order to stabilize the influence caused by the temperature, the $BaZrO_3$ is added to lower the Curie point temperature to be under room temperature so as to form stable cubic structure. The stability of the cubic structure can improve the stability of the dielectric property relative to the temperature. The differences of the present invention and the prior art US 20110164346 and U.S. Pat. No. 8,450,230 are shown in Table 1. In Table 1, regarding the main composition in the present invention, the least added amount of the $BaZrO_3$ is 20 mol %, while the most added is 40 mol %. However, regarding the main composition of the prior art, the added amount of the $BaZrO_3$ is less than 14 mol % (14 mol % at most). Except the noticeable difference of the added amount of the $BaZrO_3$, the main feature of X7T lies in the stability of the DC bias. Therefore, the present invention focuses on the improvement of this feature (the DC bias of the present invention is significantly superior to the prior art) and also conforms to the requirement of X7T. Even though the permittivity of the present invention is lower than the prior art, the present invention can still modify the product to improve the permittivity during product development.

Table 1 Comparison of the characteristic of the ceramic capacitor dielectric material compared with cited reference

TABLE 1

Comparison of the characteristic of the ceramic capacitor dielectric material compared with cited reference

| | reference | present invention |
|---|---|---|
| main composition | adding $BaZrO_3$ less than 14 mol % | adding $BaZrO_3$ more than 20 mol % |
| structure | shell structure | cubic structure |
| controlling factors of structure | heating rate, $BaZrO_3$ with different mol %, or rare earth element R | $BaZrO_3$ with different mol % |
| electrode | Base-Metal Electrode | Base-Metal Electrode |
| permittivity | better | larger than 350 |
| dielectric loss | — | smaller than 0.5% |
| resistivity | — | larger than $10^{11}$ |
| characteristic of | — | better |

TABLE 1-continued

Comparison of the characteristic of the ceramic capacitor dielectric material compared with cited reference

| | reference | present invention |
|---|---|---|
| DC bias conform to X7T regulation | yes | yes |

The electrode used in the present invention is Base-Metal Electrode (BME). Since the MLCC pursues miniaturization and the increasing of stacking layers, the cost of the electrode eventually increases as well. The cost of the electrode is about 30-40 percent of the final product. Therefore, the selection of the electrode should also put into consideration. Compared to the high cost NME (Noble Metal Electrode), which uses Ag/Pd, the present invention selects low cost BME, which uses Ni/Cu to manufacture the MLCC. Since the Ni/Cu used in BME is easy to oxidize under high temperature, the sintering process should be performed under reduce atmosphere.

In order to make sure that the dielectric property can conform to the requirement of X7T, the present invention selects at least one rare earth element as a dopant to be mixed with the compound, thereby stabilizing the influence of the temperature to the capacitance and the electric field to the temperature. The rare earth elements can be $La_2O_3$, $CeO_2$, $Pr_6O_{11}$, $Nd_2O_3$, $Pm_2O_3$, $Sm_2O_3$, $Eu_2O_3$, $Gd_2O_3$, $Dy_2O_3$, $Ho_2O_3$, $Er_2O_3$, $Tm_2O_3$, and $Yb_2O_3$. Wherein, the added amount of the rare earth elements is 0.5-10 mol %. Take $Ho_2O_3$ for example, the added amount of $Ho_2O_3$ is 0.5-10 mol %, which can be 0.5, 1, 1.5, 2, 2.5, 3, 3.5, 4, 4.5, 5, 5.5, 6, 6.5, 7, 7.5, 8, 8.5, 9, 9.5, or 10 mol %. The added amounts of the other rare earth elements are the same as $Ho_2O_3$, and thus not repeat hereinafter.

In addition to the rare earth element, the transition elements can also be added in the compound. The transition elements can be $Nb_2O_5$, $WO_3$, $Ta_2O_5$, $CoCO_3$, $CuO$, $MnCO_3$, $Cr_2O_3$, $TiO_2$, $ZrO_2$, $Sc_2O_3$, $NiO$, and $ZnO$. Wherein, the added amount of the transition elements is 0.5-10 mol %. Take $Nb_2O_5$ for example, the added amount of $Nb_2O_5$ is 0.5-10 mol %, which can be 0.5, 1, 1.5, 2, 2.5, 3, 3.5, 4, 4.5, 5, 5.5, 6, 6.5, 7, 7.5, 8, 8.5, 9, 9.5, or 10 mol %. The added amounts of the other transition elements are the same as $Nb_2O_5$, and thus not repeat hereinafter.

Please refer to Table 2A to 2D, the present invention sets 22 experimental groups, each of which has different material ratio. It is noted that all the material ratios applied in these 22 experimental groups are just examples, and the actual ratio is not limited thereto. Also, there is no $Nb_2O_5$ added to all these 22 experimental groups. However, in actual using, the $Nb_2O_5$ can also be added.

TABLE 2A

Data of the mole percentage of different experimental groups of the ceramic capacitor dielectric material

| | main composition | | | dopant | | | | |
|---|---|---|---|---|---|---|---|---|
| Experimental group | $BaTiO_3$ [mol %] | $BaZrO_3$ [mol %] | $SrTiO_3$ [mol %] | $MgCO_3$ [mol %] | $Ho_2O_3$ [mol %] | $La_2O_3$ [mol %] | $Gd_2O_3$ [mol %] | $SiO_2$ [mol %] |
| 1 | 80.0 | 20.0 | — | 2.00 | — | — | — | — |
| 2 | 60.0 | 30.0 | 10.0 | 2.00 | — | — | — | — |
| 3 | 65.0 | 35.0 | — | 2.00 | 2.00 | 1.00 | — | — |
| 4 | 65.0 | 35.0 | — | 4.00 | 2.00 | 2.00 | — | — |
| 5 | 65.0 | 35.0 | — | 2.0 | 1.50 | — | — | — |
| 6 | 65.0 | 35.0 | — | 2.0 | 2.00 | — | — | — |

TABLE 2A-continued

Data of the mole percentage of different experimental groups of the ceramic capacitor dielectric material

| | main composition | | | dopant | | | | |
|---|---|---|---|---|---|---|---|---|
| Experimental group | $BaTiO_3$ [mol %] | $BaZrO_3$ [mol %] | $SrTiO_3$ [mol %] | $MgCO_3$ [mol %] | $Ho_2O_3$ [mol %] | $La_2O_3$ [mol %] | $Gd_2O_3$ [mol %] | $SiO_2$ [mol %] |
| 7 | 65.0 | 35.0 | — | 2.0 | 2.50 | — | — | — |
| 8 | 65.0 | 35.0 | — | 2.0 | 3.00 | — | — | — |

TABLE 2B

Data of the mole percentage of different experimental groups of the ceramic capacitor dielectric material

| | main composition | | | dopant | | | | |
|---|---|---|---|---|---|---|---|---|
| Experimental group | $BaTiO_3$ [mol %] | $BaZrO_3$ [mol %] | $SrTiO_3$ [mol %] | $MgCO_3$ [mol %] | $Ho_2O_3$ [mol %] | $La_2O_3$ [mol %] | $Gd_2O_3$ [mol %] | $SiO_2$ [mol %] |
| 9  | 65.0 | 35.0 | — | 2.00 | 4.00 | — | — | — |
| 10 | 65.0 | 35.0 | — | 2.00 | 4.50 | — | — | — |
| 11 | 65.0 | 35.0 | — | 2.00 | 5.00 | — | — | — |
| 12 | 65.0 | 35.0 | — | 2.00 | — | — | 0.00 | 0.00 |
| 13 | 65.0 | 35.0 | — | 2.00 | — | — | 1.00 | 2.00 |
| 14 | 65.0 | 35.0 | — | 2.00 | — | — | 2.00 | 2.00 |
| 15 | 65.0 | 35.0 | — | 2.00 | — | — | 3.00 | 2.00 |
| 16 | 65.0 | 35.0 | — | 2.00 | — | — | 3.50 | 2.00 |

TABLE 2C

Data of the mole percentage of different experimental groups of the ceramic capacitor dielectric material

| | main composition | | | dopant | | | | |
|---|---|---|---|---|---|---|---|---|
| Experimental group | $BaTiO_3$ [mol %] | $BaZrO_3$ [mol %] | $SrTiO_3$ [mol %] | $MgCO_3$ [mol %] | $Ho_2O_3$ [mol %] | $La_2O_3$ [mol %] | $Gd_2O_3$ [mol %] | $SiO_2$ [mol %] |
| 17 | 65.0 | 35.0 | — | 2.00 | — | — | 4.00 | 2.00 |
| 18 | 65.0 | 35.0 | — | 2.00 | — | — | 4.50 | 2.00 |
| 19 | 65.0 | 35.0 | — | 2.00 | — | — | 5.00 | 2.00 |

TABLE 2D

Data of the mole percentage of different experimental groups of the ceramic capacitor dielectric material

| | main composition | | | dopant | | | | |
|---|---|---|---|---|---|---|---|---|
| Experimental group | $BaTiO_3$ [mol %] | $BaZrO_3$ [mol %] | $SrTiO_3$ [mol %] | $MgCO_3$ [mol %] | $Ho_2O_3$ [mol %] | $La_2O_3$ [mol %] | $Gd_2O_3$ [mol %] | $SiO_2$ [mol %] |
| 20 | 80.0 | 20.0 | — | 2.00 | — | — | 4.50 | 2.00 |
| 21 | 75.0 | 25.0 | — | 2.00 | — | — | 4.50 | 2.00 |
| 22 | 60.0 | 40.0 | — | 2.00 | — | — | 4.50 | 2.00 |

After measuring and analyzing the dielectric property of the samples of the 22 experimental groups which use sticking electrodes, as shown in Table 3A and 3C, the data of the specific permittivity, the capacitance in room temperature compared to the capacitance between 125° C. to −55° C. (Temp. Characteristic X7T), dielectric loss at 25° C., resistivity, and capacitance change at 2.5 kV/mm[%] can be obtained. Among these 22 experimental groups, the NO. 4, NO. 18, NO. 19, NO. 22 can conform to the TCC requirement of X7T, and the loss rates of the DC bias are all around 1.5%. The X7T is a specific ceramic capacitance number, and the main application of the X7T is to decrease the capacitance loss under the high intensity electric field. Therefore, the TCC curve of the present invention is not only in the field of X7T, but also performs well in DC bias. Besides, the ratio of the $BaTiO_3$ and $BaZrO_3$ of the experimental groups NO. 20, NO. 21, NO. 22 are adjusted based on experimental group NO. 18 which fulfills the requirement of X7T, and thus people can realize when the fixed amount of dopant is added, what influence will be caused by adjusting the ratio of the $BaTiO_3$ and $BaZrO_3$.

TABLE 3A

Data of the analysis results of the dielectric properties of different experimental groups of the ceramic capacitor dielectric material.

| Experimental group | Permittivity | the capacitance between 125° C. and −55° C. /the capacitance in room temperature | | Dielectric loss rate in room temperature [%] | Resistivity | | Capacitance loss rate at 2.5 kV/mm [%] | Conform to X7T regulation |
| --- | --- | --- | --- | --- | --- | --- | --- | --- |
| | | at −55° C. [%] | at 125° C. [%] | | at −55° C. [Ω-cm] | at 125° C. [Ω-cm] | | |
| 1 | 3259 | 19.9 | −68.3 | 0.25 | $1.68 \times 10^9$ | $3.87 \times 10^9$ | — | NO |
| 2 | 717 | 83.7 | −41.6 | 0.39 | $7.68 \times 10^9$ | $4.42 \times 10^9$ | — | NO |
| 3 | 772 | 30.8 | −25.5 | 0.02 | $7.45 \times 10^{10}$ | $1.78 \times 10^9$ | — | NO |
| 4 | 497 | 19.8 | −24.2 | 0.0 | $9.88 \times 10^{11}$ | $1.3 \times 10^9$ | −1.25 | YES |
| 5 | 759 | 69.5 | −41.8 | 0.09 | $2.50 \times 10^{11}$ | $2.64 \times 10^9$ | — | NO |
| 6 | 608 | 62.1 | −39.3 | 0.10 | $2.76 \times 10^{11}$ | $3.33 \times 10^9$ | — | NO |
| 7 | 607 | 54.5 | −36.9 | 0.10 | $3.06 \times 10^{11}$ | $4.40 \times 10^9$ | — | NO |

TABLE 3B

Data of the analysis results of the dielectric properties of different experimental groups of the ceramic capacitor dielectric material.

| Experimental group | Permittivity | the capacitance between 125° C. and −55° C./the capacitance in room temperature | | Dielectric loss rate in room temperature [%] | Resistivity | | Capacitance loss rate at 2.5 kV/mm [%] | Conform to X7T regulation |
| --- | --- | --- | --- | --- | --- | --- | --- | --- |
| | | at −55° C. [%] | at 125° C. [%] | | at −55° C. [Ω-cm] | at 125° C. [Ω-cm] | | |
| 8 | 575 | 52.6 | −36.1 | 0.1 | $2.92 \times 10^{11}$ | $4.47 \times 10^9$ | — | NO |
| 9 | 584 | 46 | −34 | 0.04 | $1.21 \times 10^{11}$ | $2.00 \times 10^9$ | −3.1 | NO |
| 10 | 539 | 41 | −32 | 0.04 | $1.39 \times 10^{11}$ | $2.31 \times 10^9$ | −1.5 | NO |
| 11 | 417 | 35 | −28 | 0.09 | $5.22 \times 10^{19}$ | $1.42 \times 10^9$ | −8.1 | NO |
| 12 | 988 | 111.6 | −49.9 | 0.05 | $1.42 \times 10^{11}$ | $1.23 \times 10^9$ | −10.02 | NO |
| 13 | 825 | 62.8 | −42.9 | 0.02 | $4.26 \times 10^{12}$ | $4.03 \times 10^{19}$ | −4.15 | NO |
| 14 | 587 | 41.4 | −34.9 | 0.006 | $4.55 \times 10^{12}$ | $2.33 \times 10^{19}$ | −2.21 | NO |

TABLE 3C

Data of the analysis results of the dielectric properties of different experimental groups of the ceramic capacitor dielectric material.

| Experimental group | Permittivity | the capacitance between 125° C. and −55° C./the capacitance in room temperature | | Dielectric loss rate in room temperature [%] | Resistivity | Capacitance loss rate at 2.5 kV/mm [%] | Conform to X7T regulation |
| --- | --- | --- | --- | --- | --- | --- | --- |
| | | at −55° C. [%] | at 125° C. [%] | | at −55° C. [Ω-cm] | 2.5 kV/mm [Ω-cm] | |
| 15 | 495 | 30.2 | −29.8 | 0.05 | $1.36 \times 10^{12}$ | $1.43 \times 10^{11}$ | −1.63 | NO |
| 16 | 449 | 25.7 | −27 | 0.03 | $1.42 \times 10^{12}$ | $1.49 \times 10^{11}$ | −1.27 | NO |
| 17 | 439 | 22.7 | −25.8 | 0.09 | $1.42 \times 10^{12}$ | $1.98 \times 10^{11}$ | −1.64 | NO |
| 18 | 425 | 20.7 | −24.5 | 0.1 | $1.43 \times 10^{12}$ | $2.43 \times 10^{11}$ | −1.36 | YES |
| 19 | 417 | 19.7 | −23.9 | 0.15 | $1.44 \times 10^{12}$ | $2.11 \times 10^{11}$ | −1.33 | YES |
| 20 | 791 | 28.1 | −33.7 | 0.16 | $9.00 \times 10^{11}$ | $3.80 \times 10^{11}$ | −4.73 | NO |
| 21 | 537 | 23.4 | −28.6 | 0.17 | $9.30 \times 10^{11}$ | $2.98 \times 10^{11}$ | −3.05 | NO |
| 22 | 370 | 19.3 | −23.7 | 0.17 | $8.51 \times 10^{11}$ | $3.21 \times 10^{11}$ | −1.25 | YES |

Figure 5A:
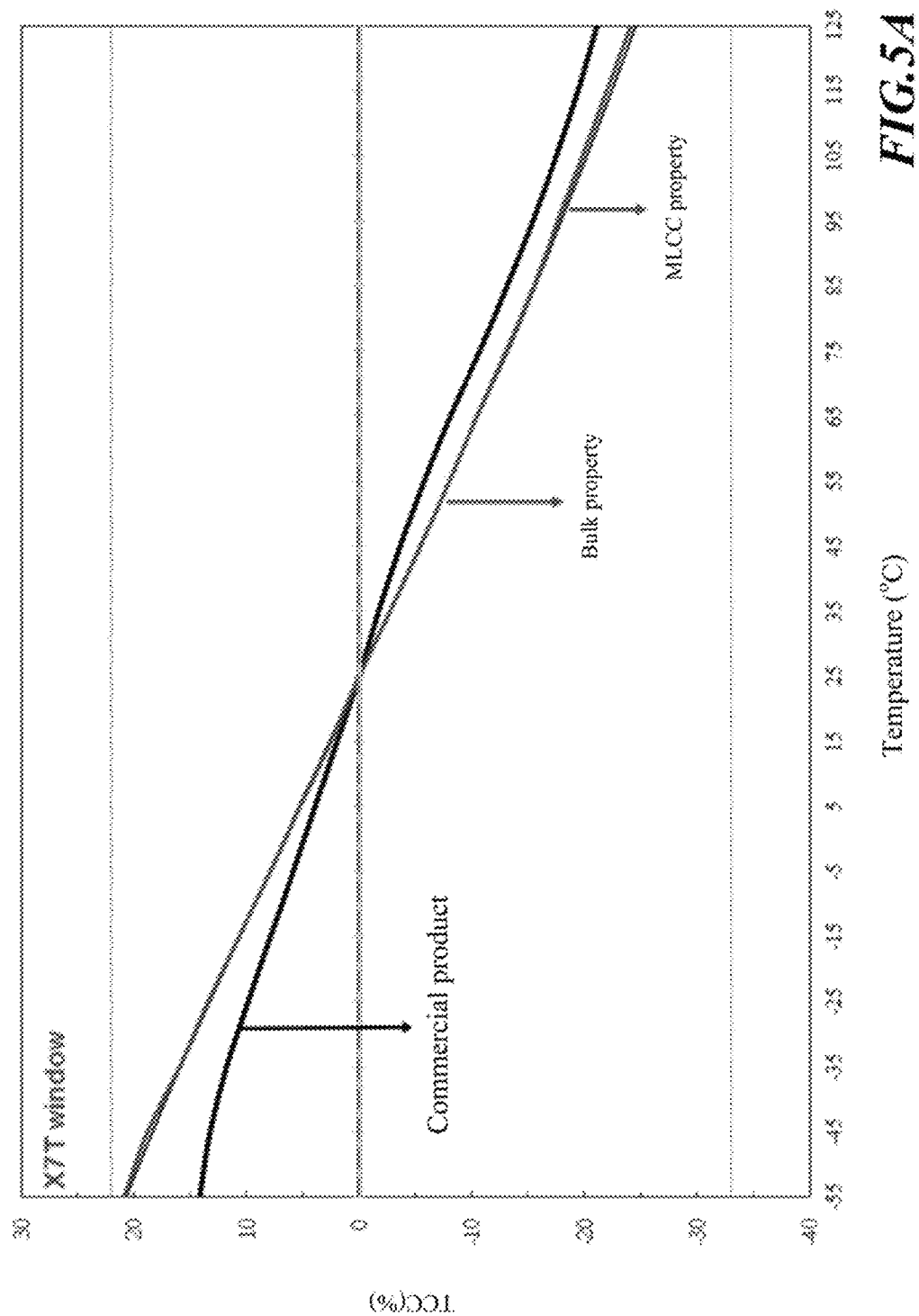
FIG. 5A is a relative schematic diagram of the TCC and temperature of the comparison of MLCC prepared sample and the commercial product with shell structure of the ceramic capacitor dielectric material.

Please refer to FIGS. 2A-2D, as mentioned in the capacitor regulation of American Electronics Industry Association, the capacitance change rate of the X7T between −55° C. to 125° C. should be between +22% to −33%. As shown in the figures, the TCC of the experimental groups NO. 4, NO. 18, NO. 19, and NO. 22 are all in the field of X7T TCC regulation. Besides, it can be seen that when taking the group NO. 18 as a control group, as the added amount of the properties analysis result, the relative schematic diagram of the TCC and temperature, and the analysis schematic diagram of the dielectric loss, are shown as Table 4, FIGS. 5A and 5B, respectively. The compared data can be found in Table 4. In FIG. 5A, the NO. 18 bulk almost overlaps with the MLCC product in TCC curve, which means all the experimental groups conform to the requirement of X7T, and thus the MLCC preparation of the present invention is possible.

TABLE 4

The dielectric properties analysis result of the comparison of MLCC prepared sample and the commercial product with shell structure of the ceramic capacitor dielectric material.

| Experimental group | Permittivity | the capacitance between 125° C. and −55° C./the capacitance in room temperature | | Dielectric loss rate in room temperature [%] | Capacitance loss rate | | | Conform to X7T regulation |
| --- | --- | --- | --- | --- | --- | --- | --- | --- |
| | | at −55° C. [%] | at 125° C. [%] | | at 2.5 V/μm [%] | at 5 V/μm [%] | at 25 V/μm [%] | |
| Commercial product NO.18 | 880 | 14.1 | −21.1 | 0.39 | −0.82 | −11.9 | −67.1 | YES |
| MLCC | 456 | 20.9 | −24.1 | 0.38 | −3.12 | −8.21 | −22.4 | YES |

BaTiO$_3$ increases (NO. 20, NO. 21), the TCC curve of the present invention will start to deviate from the X7T regulation, and the characteristic of the DC bias of the present invention will get worse, while the specific permittivity will increase significantly; when the added amount of the BaTiO$_3$ decreases (NO. 22), the TCC curve of the present invention will be in the field of X7T regulation, and the characteristic of the DC bias of the present invention will get better, and the specific permittivity will decrease slightly.

Please refer to FIGS. 3A-3D, the more the dielectric loses, the less capacity the capacitor has. The energy may lose in a form of light or heat. Therefore, the dielectric loss should be as few as possible. In the present invention, the dielectric loss of all the 22 experimental groups is few, especially under room temperature, which is all below 0.5%. According to the experimental groups NO. 18, NO. 20, NO. 21, NO. 22, even though the ratio of the BaTiO$_3$ and BaZrO$_3$ have be adjusted, there is no significantly different regarding the dielectric loss. Therefore, it is assumed that the inhibition to the dielectric loss is caused by adding the rare earth element (R).

Referring to FIGS. 4A to 4F, part of the experimental groups which are under different DC bias and dielectric loss are shown in diagram. The purpose of the present invention is to minimize the dielectric loss when the applied electric field increases. Therefore, it is desired that the dielectric loss under high intensity electric field can be minimized. Also as shown in Table 2A to 2C, the present invention performs well under the DC bias. The more BaTiO$_3$ exist (NO. 20, NO. 21), the more specific permittivity increase; when the amount of the BaTiO$_3$ decreases (NO. 22), the specific permittivity will decrease slightly. However, all these experimental groups still conform to the requirement of X7T.

Figure 5B:
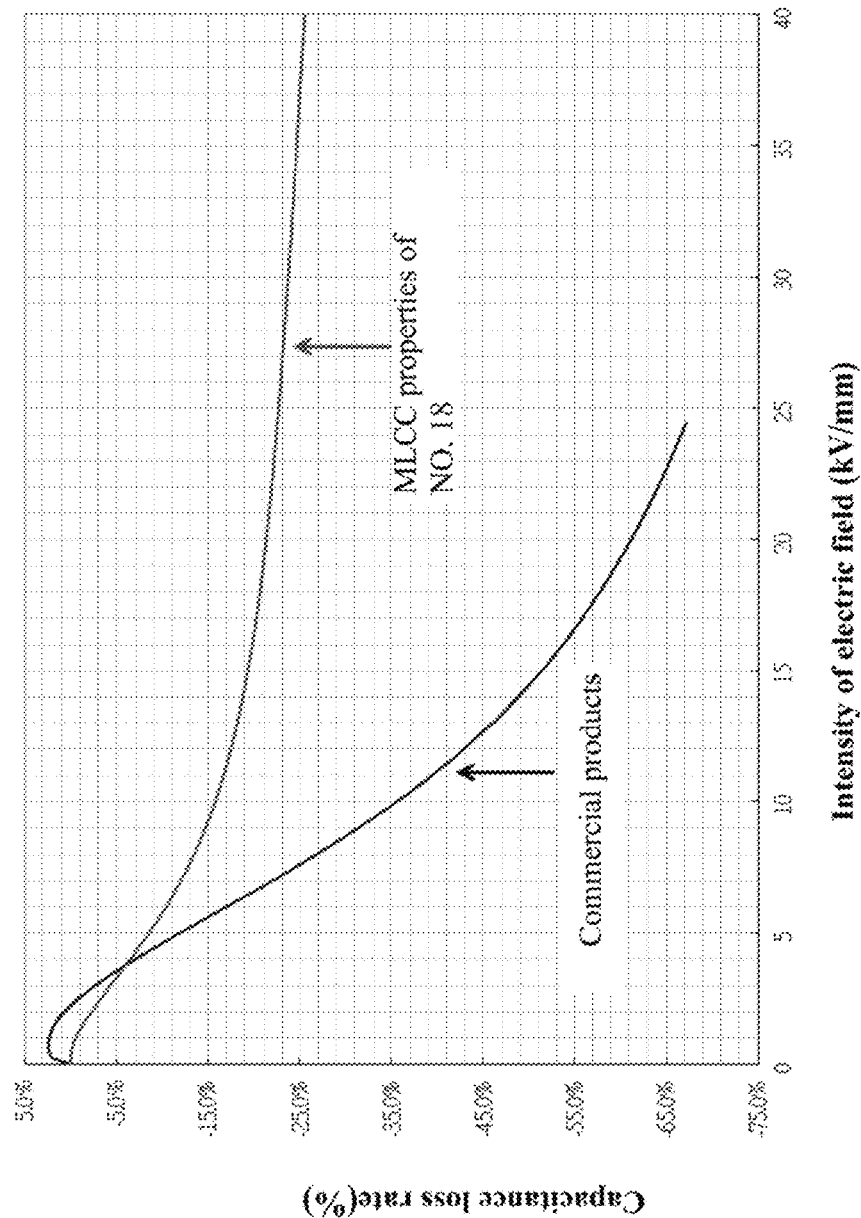
FIG. 5B is an analysis schematic diagram of the dielectric loss of the comparison of MLCC prepared sample and the commercial product with shell structure of the ceramic capacitor dielectric material.

Furthermore, preparing the MLCC for NO. 18 as a sample and having the sample analyzed, and then comparing the analyzed result with the commercial product with shell structure, wherein the schematic diagram of the dielectric Also as shown in FIG. 5B, even though the commercial product with shell structure has better temperature stability than the present invention, and the specific permittivity is superior than the present invention as well, however, as shown in FIG. 5B, the MLCC made by the experimental group NO. 18 has excellent characteristic of DC bias, which is much more superior than the commercial product. Thus, the present invention is suitable for being applied to the commercial product. The dielectric loss and the resistivity in room temperature for the present invention and the commercial product are almost the same.

The advantages of the ceramic capacitor dielectric material according to the present invention compared to other unknown technique are as follows:

1. The ceramic capacitor dielectric material according to the present invention uses composite materials, which mainly includes BaTiO$_3$, BaZrO$_3$, SrTiO$_3$, and mixed with MgCO$_3$, SiO$_2$ and at least one compound. The compound is selected from transition element or rare earth element, thereby making a ceramic capacitor dielectric material fulfilling the X7T dielectric properties of EIA.

2. The ceramic capacitor dielectric material according to the present invention can conform to requirement that the capacitance change rate of the X7T between −55° C. to 125° C. should be between +22% to −33%. And also, the dielectric loss under different temperatures are all few (fewer than 0.5%; the specific permittivity is larger than 350).

3. The resistivity of the ceramic capacitor dielectric material according to the present invention can reach $10^{12}$ Ω-cm under room temperature, and further reach $10^{11}$ Ω-cm at 125° C.

4. The purpose of the present invention is to minimize the dielectric loss when the applied electric field increases. Therefore, it is desired that the dielectric loss under high intensity electric field can be minimized. The capacitance change rate of the ceramic capacitor dielectric material according to the present invention under DC bias also has good performance.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A ceramic capacitor dielectric material comprising 40-65 mol % of $BaTiO_3$, 20-40 mol % of $BaZrO_3$, 5-20 mol % of $SrTiO_3$, 2-6 mol % of $MgCO_3$, 2 mol % of $SiO_2$, and 0.5-10 mol % of at least one compound selected from the group consisting of $La_2O_3$, $CeO_2$, $Pr_6O_{11}$, $Nd_2O_3$, $Pm_2O_3$, $Sm_2O_3$, $Eu_2O_3$, $Gd_2O_3$, $Dy_2O_3$, $Ho_2O_3$, $Er_2O_3$, $Tm_2O_3$, $Yb_2O_3$ $Nb_2O_5$, $WO_3$, $Ta_2O_5$, $CoCO_3$, $CuO$, $MnCO_3$, $Cr_2O_3$, $TiO_2$, $ZrO_2$, $Sc_2O_3$, $NiO$, and $ZnO$.

2. The ceramic capacitor dielectric material according to claim 1, wherein a dielectric loss of the ceramic capacitor dielectric material under room temperature is smaller than 0.5%.

3. The ceramic capacitor dielectric material according to claim 1, wherein a capacitance change rate of the ceramic capacitor dielectric material between −55 to 125° C. is +22% to −33%.

* * * * *